US006789213B2

(12) United States Patent
Kumar et al.

(10) Patent No.: US 6,789,213 B2
(45) Date of Patent: *Sep. 7, 2004

(54) CONTROLLED TAKE OVER OF SERVICES BY REMAINING NODES OF CLUSTERED COMPUTING SYSTEM

(75) Inventors: Krishna Kumar, Cupertino, CA (US); Declan J. Murphy, San Francisco, CA (US); Andrew L. Hisgen, Cupertino, CA (US)

(73) Assignee: Sun Microsystems, Inc., Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/479,485

(22) Filed: Jan. 10, 2000

(65) Prior Publication Data

US 2003/0159084 A1 Aug. 21, 2003

(51) Int. Cl.⁷ ............................................. G06F 11/00
(52) U.S. Cl. ............................ 714/13; 714/4; 714/10; 714/11; 714/12; 709/220; 709/221; 718/102; 718/103; 718/104; 718/105
(58) Field of Search .................................. 714/4, 11–13, 714/10; 709/102–105, 220, 221; 718/102–105

(56) References Cited

U.S. PATENT DOCUMENTS

| 5,283,783 A | | 2/1994 | Nguyen et al. |
| 5,459,857 A | | 10/1995 | Ludlam et al. ................ 714/6 |
| 5,481,747 A | * | 1/1996 | Kametani .................. 718/102 |
| 5,687,308 A | * | 11/1997 | Jardine et al. ................ 714/4 |
| 5,774,660 A | | 6/1998 | Brendel et al. ............. 709/201 |
| 5,790,772 A | * | 8/1998 | Badovinatz et al. ........... 714/4 |
| 5,822,531 A | | 10/1998 | Gorczyca et al. |
| 5,887,127 A | * | 3/1999 | Saito et al. .................... 714/4 |

(List continued on next page.)

FOREIGN PATENT DOCUMENTS

| EP | 0817444 A2 | 1/1998 |
| EP | 0865180 A2 | 9/1998 |
| WO | WO98/26559 | 6/1998 |
| WO | WO 99/33227 | 7/1999 |

OTHER PUBLICATIONS

Goldszmidt, Germán S., "Load Management for Scaling up Internet Services", Feb. 15–20, 1998, IEEE Network Operations and Management Symposium, NOMS98, vol. 3, pp. 828–835.

(List continued on next page.)

*Primary Examiner*—Robert Beausoliel
*Assistant Examiner*—Michael Maskulinski
(74) *Attorney, Agent, or Firm*—Beyer Weaver & Thomas, LLP

(57) ABSTRACT

Improved techniques for controlled take over of services for clustered computing systems are disclosed. The improved techniques can be implemented to allow one sub-cluster of the clustered computing system to safely take over services of one or more other sub-clusters in the clustered computing system. Accordingly, if the clustered computing system is fragmented into two or more disjointed sub-clusters, one sub-cluster can safely take over services of the one or more other sub-clusters after the one or more other sub-clusters have been shutdown. As a result, the clustered computing system can continue to safely provide services even when the clustered computing system has been fragmented into two or more disjointed sub-clusters due to an operational failure.

18 Claims, 7 Drawing Sheets

U.S. PATENT DOCUMENTS

| | | | |
|---|---|---|---|
| 5,890,014 A | | 3/1999 | Long .......................... 710/8 |
| 5,909,540 A | * | 6/1999 | Carter et al. .................. 714/4 |
| 5,918,017 A | | 6/1999 | Attanasio et al. |
| 5,964,838 A | | 10/1999 | Cheung et al. |
| 5,964,886 A | | 10/1999 | Slaughter et al. |
| 5,991,518 A | | 11/1999 | Jardine et al. |
| 5,996,001 A | * | 11/1999 | Quarles et al. ................ 714/4 |
| 6,002,851 A | | 12/1999 | Basavaiah et al. |
| 6,003,075 A | | 12/1999 | Arendt et al. .............. 709/221 |
| 6,097,882 A | | 8/2000 | Mogul |
| 6,108,699 A | * | 8/2000 | Moiin ....................... 709/201 |
| 6,185,619 B1 | | 2/2001 | Joffe et al. |
| 6,192,483 B1 | | 2/2001 | Moiin et al. .................. 714/4 |
| 6,195,680 B1 | | 2/2001 | Goldszmidt et al. |
| 6,219,786 B1 | | 4/2001 | Cunningham et al. ...... 713/152 |
| 6,226,684 B1 | | 5/2001 | Sung et al. |
| 6,243,744 B1 | | 6/2001 | Snaman, Jr. et al. ........ 709/220 |
| 6,247,141 B1 | | 6/2001 | Holmberg |
| 6,256,675 B1 | | 7/2001 | Rabinovich |
| 6,304,980 B1 | | 10/2001 | Beardsley et al. ............. 714/6 |
| 6,363,077 B1 | | 3/2002 | Wong et al. |
| 6,363,495 B1 | | 3/2002 | MacKenzie et al. |
| 6,424,992 B2 | | 7/2002 | Devarakonda et al. |
| 6,427,163 B1 | | 7/2002 | Arendt et al. ............... 709/201 |
| 6,438,652 B1 | | 8/2002 | Jordan et al. |
| 6,438,705 B1 | | 8/2002 | Chao et al. |
| 6,442,713 B1 | * | 8/2002 | Block et al. ................. 714/43 |
| 6,445,709 B1 | | 9/2002 | Chiang |
| 6,453,426 B1 | | 9/2002 | Gamache et al. |
| 6,470,389 B1 | | 10/2002 | Chung et al. |
| 6,532,494 B1 | | 3/2003 | Frank et al. |

OTHER PUBLICATIONS

Hunt et al., "Network Dispatcher: a connection router for scalable Internet services", 1998, © *1998 Published by Elsevier Science B.V.*, Computer Networks and ISDN Systems, vol. 30, pp. 347–357.

Scheible, "Information Technology, Serial Storage Architecture–SCSI–3 Protocol (SSA–S3P)," Rev. 5b, Apr. 1997.

Lamport, "A New Solution of Dijkstra's Concurrent Programming Problem," Aug. 1974, Communications of the ACM, vol. 17, No. 8, pp 453–455.

Preslan et al., "Device Locks: Mutual Exclusion for Storage Area Networks," Mar. 15, 1999, IEEE.

Soltis et al., "The Design and Performance of a Shared Disk File System for IRIX," Mar. 23, 1998, Sixth NASA Goddard Space Center Conference on Mass Storage and Technologies.

VanHalderen et al., "Hierarchical resource management in the Polder metacomputing Initiative", (11/98) Parallel Computing, NL/Elsevier Science Publ., Amsterdam, vol. 24, No. 12–13, pp. 1807–1825.

Chang et al., "An ordered and reliable broadcast protocol for distributed systems", (7/97) Computer Comm., NL/Elsevier Science Publ., Amsterdam, vol. 20, No. 6, pp. 487–99.

* cited by examiner

CONTROLLED TAKE OVER OF SERVICES BY REMAINING NODES OF CLUSTERED COMPUTING SYSTEM

CROSS-REFERENCE TO RELATED APPLICATIONS

This application is related to the following applications, filed concurrently herewith and incorporated herein by reference: (1) U.S. patent application Ser. No. 09/480,785, entitled "METHOD AND APPARATUS FOR MANAGING OPERATIONS OF CLUSTERED COMPUTER SYSTEMS"; (2) U.S. patent application Ser. No. 09/480,466, entitled "METHOD AND APPARATUS FOR DYNAMICALLY ALTERING CONFIGURATIONS OF CLUSTERED COMPUTER SYSTEMS"; (3) U.S. patent application Ser. No. 09/479,468, entitled "METHOD AND APPARATUS FOR RESOLVING PARTIAL CONNECTIVITY IN A CLUSTERED COMPUTING SYSTEM"; (4) U.S. patent application Ser. No. 09/480,330, entitled "METHOD TO DYNAMICALLY CHANGE CLUSTER OR DISTRIBUTED SYSTEM CONFIGURATION"; and (5) U.S. patent application Ser. No. 09/480,329, entitled "EMULATION OF PERSISTANT GROUP RESERVATIONS".

BACKGROUND OF THE INVENTION

1. Field of the Invention

The present invention relates to clustered computing systems and, more particularly, to improved methods and apparatus for controlled take over of services by remaining computing nodes of the clustered computing system after one or more other nodes have been shutdown.

2. Description of the Related Art

In contrast to single mainframe computing models of the past, more distributed computing models have recently evolved. One such distributed computing model is known as a clustered computing system. FIG. 1 illustrates an exemplary clustered computing system 100 including computing nodes (nodes) A, B and C, storage devices (e.g., storage disks 102–104), and other computing devices 106–110 representing other devices such as scanners, printers, digital cameras, etc. For example, each of the nodes A, B and C can be a computer with its own processor and memory. The collection of nodes A, B and C, storage disks 102–104, and other devices 106–110 make up the clustered computing system 100.

Typically, the nodes in a cluster are coupled together through a "private" interconnect with redundant pathways. As shown in FIG. 1, nodes A, B and C are coupled together through private communication channels 112 and 114. For example, the private communication channels 112 and 114 can adhere to Ethernet, ATM, or Scalable Coherent Interconnect (SCI) standards. A client 116 can communicate with the clustered computing system 100 via a network 118 (e.g., public network) using a variety of protocols such as Transmission Control Protocol (TCP), User Datagram Protocol (UDP), etc. From the point of view of the client 116, the clustered computing system 100 is a single entity that can provide the client 116 with a variety of computer-implemented services, e.g., web-hosting, transaction processing, etc. In other words, the client 116 is not aware of which particular node(s) of the clustered computing system 100 is (are) providing service to it.

The clustered computing system 100 provides a scalable and cost-efficient model where off-the-shelf computers can be used as nodes. The nodes in the clustered computing system 100 cooperate with each other to provide a distributed computing model that is transparent to users, e.g., the client 116. In addition, in comparison with single mainframe computing models, the clustered computing system 100 provides improved fault tolerance. For example, in case of a node failure within the clustered computing system 100, other nodes can take over to perform the services normally performed by the node that has failed.

Typically, nodes in the clustered computing system 100 send each other "responsive" (often referred to as "heartbeat" or activation) signals over the private communication channels 112 and 114. The responsive signals indicate whether nodes are active and responsive to other nodes in the clustered computing system 100. Accordingly, these responsive signals are periodically sent by each of the nodes so that if a node does not receive the responsive signal from another node within a certain amount of time, a node failure can be suspected. For example, in the clustered computing system 100, if nodes A and B do not receive a signal from node C within an allotted time, nodes A and B can suspect that node C has failed. In this case, if nodes A and B are still responsive to each other, a two-node sub-cluster (AB) results. From the perspective of the sub-cluster (AB), node C can be referred to as a "non-responsive" node. If node C has really failed then it would be desirable for the two-node sub-cluster (AB) to take over services from node C. However, if node C has not really failed, taking over the services performed by node C could have dire consequences. For example, if node C is performing write operations to the disk 104 and node B takes over the same write operations while node C is still operational, data corruption can result.

It should be noted that the fact that nodes A and B have not received responsive signals from node C does not necessarily mean that node C is not operational with respect to the services that are provided by node C. Other events can account for why responsive signals for node C have not been received by nodes A and B. For example, the private communication channels 112 and 114 may have failed. It is also possible that node C's program for sending responsive signals may have failed but node C is fully operational with respect to the services that it provides. Thus, it is possible for the clustered computing system 100 to get divided into two or more functional sub-clusters wherein the sub-clusters are not responsive to each other. This situation can be referred to as a "partition in space" or "split brain" where the cluster no longer behaves as a single cohesive entity. In such situations, it is desirable to allow at most one sub-cluster to remain active. Moreover, the one and only sub-cluster remaining active should take over the services of other sub-clusters.

One problem in taking over the services of the other sub-clusters that are being shutdown is that partitions in space can occur for a brief period. In other words, if the remaining cluster begins its takeover before the other sub-clusters have stopped processing and shutdown, data corruption or data loss can result. Accordingly, take over of the services by the one remaining sub-cluster needs to be synchronized with the shutdown of all other sub-clusters. However, this synchronization is problematic partly because the disjointed sub-clusters typically do not have a mechanism to communicate with each other. In view of the foregoing, there is a need for improved methods to safely take over services from other nodes in clustered computing systems.

SUMMARY OF THE INVENTION

Broadly speaking, the invention relates to improved techniques for managing operations of clustered computing systems. The improved techniques allow one sub-cluster of the clustered computing system to safely take over services of one or more other sub-clusters in the clustered computing system. Accordingly, if the clustered computing system is fragmented into two or more disjointed sub-clusters, one sub-cluster can safely take over services of the one or more other sub-clusters after the one or more other sub-clusters have been shutdown. As a result, the clustered computing system can continue to safely provide services even when the clustered computing system has been fragmented into two or more disjointed sub-clusters due to an operational failure.

The invention can be implemented in numerous ways, including a system, an apparatus, a method or a computer readable medium. Several embodiments of the invention are discussed below.

As a method for taking over services by a sub-cluster of a clustered computing system from one or more other sub-clusters of the clustered computing system after the one or more other sub-clusters have been shutdown, an embodiment of the present invention includes the acts of: attempting to determine whether a sub-cluster of the clustered computing system is to remain active; initiating shutdown of the sub-cluster when said attempting does not determine within a first predetermined amount of time that the sub-cluster is to remain active; delaying for a second predetermined amount of time after the first predetermined amount of time expires when said attempting determines within the first predetermined amount of time that the sub-cluster is to remain active; and taking over services of one or more other sub-clusters of the clustered computing system after said delaying for the second predetermined amount of time.

As another method for taking over services by a sub-cluster of a clustered computing system from one or more other sub-clusters of the clustered computing system after the one or more other sub-clusters have been shutdown, another embodiment of the present invention includes the acts of: determining whether one or more computing nodes in a cluster have become one or more non-responsive nodes; starting a first timer when said determining determines that one or more of the computing nodes in the cluster have become one or more non-responsive nodes, the first timer has a first duration; attempting to determine whether a sub-cluster vote is at least a majority of a total votes available, the sub-cluster vote representing votes for a sub-cluster of one or more computing nodes, the sub-cluster representing a portion of the cluster that remains responsive; initiating shutdown of the one or more computing nodes of the sub-cluster when said attempting does not determine within the first duration of the first timer that the sub-cluster vote is at least a majority of the total votes available; starting a second timer after the first timer expires when the said attempting has determined within the first duration of the first timer that the sub-cluster vote is at least a majority of the total votes available, the second timer having a second duration; and taking over services from the one or more non-responsive nodes by at least one of the computing nodes of the sub-cluster after the second timer expires.

As a clustered computing system, one embodiment of the invention includes a cluster of computing nodes having at least two computing nodes, and an integrity protector provided with each one of the computing nodes. The integrity protector operates to determine whether a set of computing nodes in the cluster are to remain active. The set of computing nodes represents at least a portion of the cluster. In addition, the integrity protector operates to allow one or more computing nodes in the set of computing nodes to take over services of one or more other computing nodes of the clustered computing system only after the one or more other computing nodes have shutdown.

As a computer readable medium including computer program code for taking over services by a sub-cluster of a clustered computing system from one or more other sub-clusters of the clustered computing system after the one or more other sub-clusters have been shutdown, one embodiment of the invention includes: computer program code for attempting to determine whether a sub-cluster of the clustered computing system is to remain active; computer program code for initiating shutdown of the sub-cluster when said computer program code for attempting does not determine within a first predetermined amount of time that the sub-cluster is to remain active; computer program code for delaying for a second predetermined amount of time after the first predetermined amount of time expires when said computer program code for attempting determines within the first predetermined amount of time that the sub-cluster is to remain active; and computer program code for taking over services of one or more other sub-clusters of the clustered computing system after said computer program code for delaying has delayed for the second predetermined amount of time.

The advantages of the invention are numerous. Different embodiments or implementations may have one or more of the following advantages. One advantage is that the invention provides for controlled take over of services in a clustered computing system. Another advantage is that controlled take over can be achieved without requiring human intervention. Still another advantage is that the techniques of the invention prevent data corruption or data loss from occurring during takeover of service from other nodes that are being shutdown. Yet another advantage is that cost effective and not overly complicated implementations are possible.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The invention pertains to techniques for managing operations of clustered computing systems. The improved techniques allow one sub-cluster of the clustered computing system to safely take over services of one or more other sub-clusters in the clustered computing system. Accordingly, if the clustered computing system is fragmented into two or more disjointed sub-clusters, one sub-cluster can safely take over services of the one or more other sub-clusters after the one or more other sub-clusters have been shutdown. As a result, the clustered computing system can continue to safely provide services even when the clustered computing system has been fragmented into two or more disjointed sub-clusters due to an operational failure.

Embodiments of the invention are discussed below with reference to FIGS. 2A–4B. However, those skilled in the art will readily appreciate that the detailed description given herein with respect to these figures is for explanatory purposes as the invention extends beyond these limited embodiments.

Figure 2A:
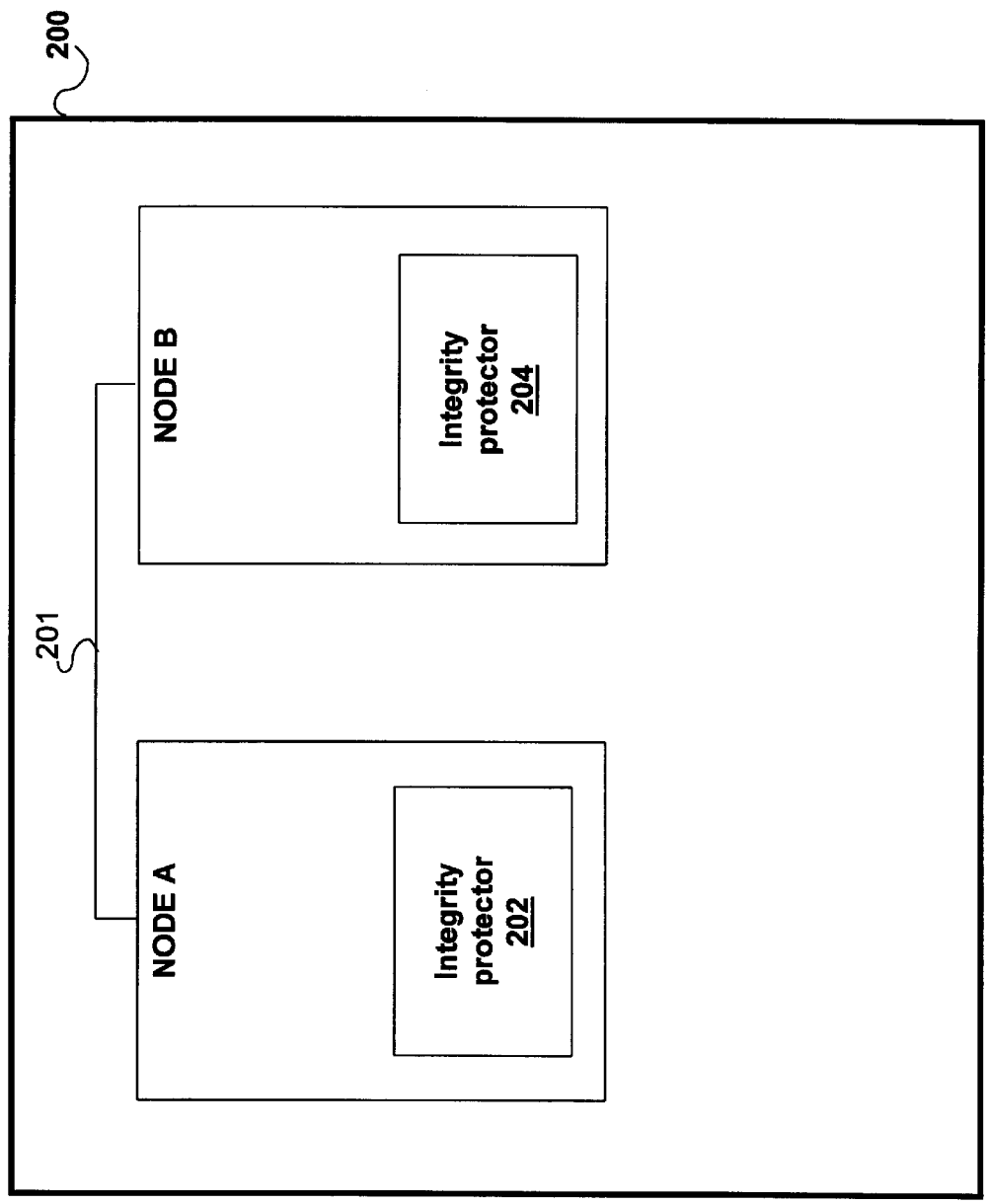
FIG. 2A illustrates an exemplary enhanced clustered computing system in accordance with one embodiment of the invention.

FIG. 2A illustrates an exemplary enhanced clustered computing system 200 in accordance with one embodiment of the invention. The enhanced clustered computing system 200 includes two computing nodes, node A and node B.

Figure 1:
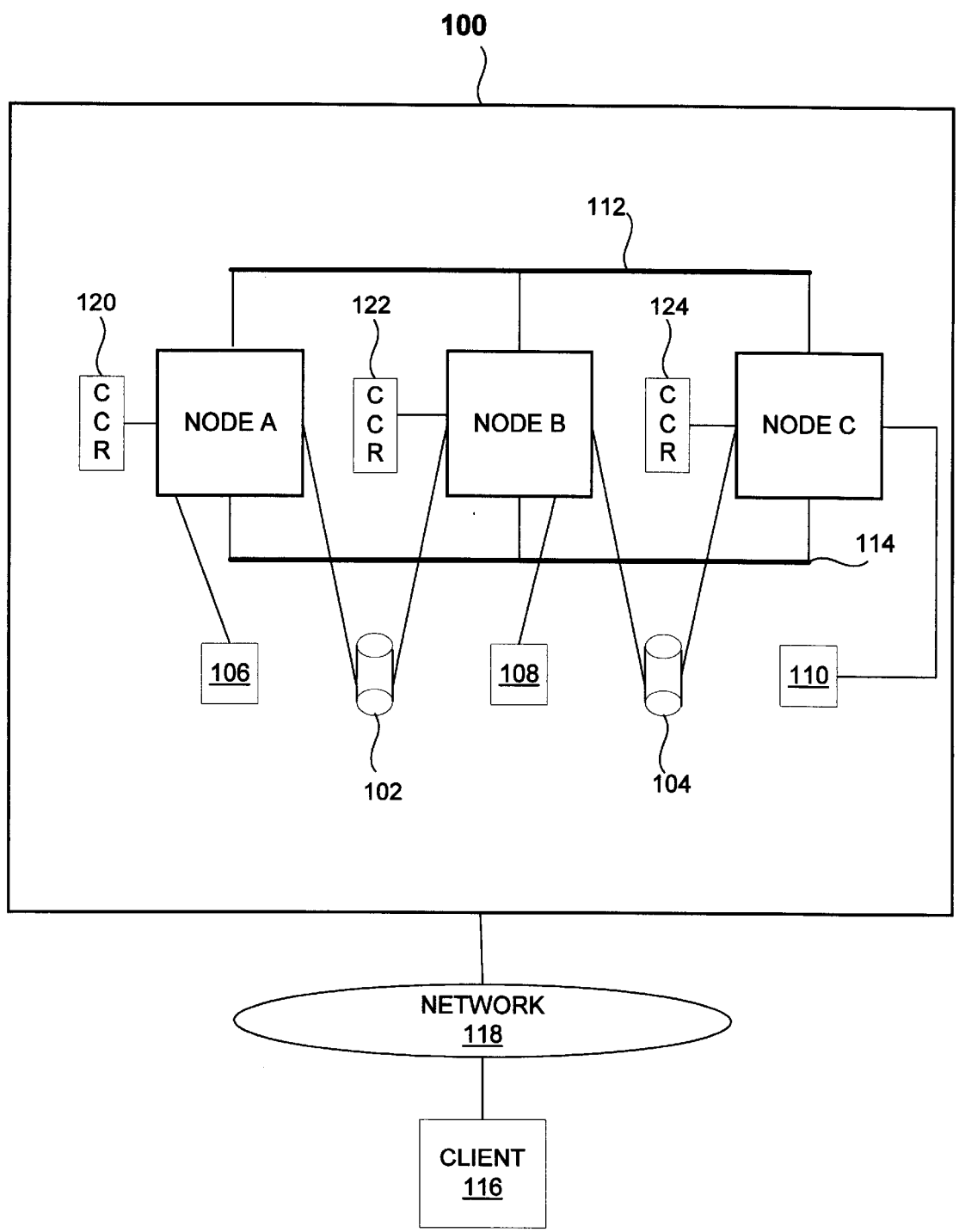
FIG. 1 illustrates an exemplary clustered computing system.

Each of the nodes A and B is typically a separate computer system, such as personal computers or a server computer. An interconnect 201 serves to interconnect the nodes with each other. In one implementation, the interconnect 201 is provided in a redundant manner with a pair of communication channels provided for each segment. The nodes A and B of the clustered computing system 200 are thus coupled together (i.e., interconnected) to form a computing cluster (cluster) and behave as a cohesive logical unit. Accordingly, the enhanced clustered computing system 200 is represented as a single entity to clients (e.g., client 116 of FIG. 1) requesting services from the enhanced clustered computing system 200. It should be recognized that computing clusters are often more complex than shown in FIG. 2A due to the presence of additional components such as one or more additional nodes and/or devices. Examples of devices include storage devices, printers, scanners, cameras, etc.

As shown in FIG. 2A, each of the nodes A and B of the clustered computing system 200 respectively includes an integrity protector 202 and 204. Among other things, the integrity protectors 202 and 204 ensure that potential problems associated with operation of clustered computing systems do not arise when the enhanced clustered computing system 200 is fragmented into two or more (disjointed) sub-clusters. More particularly, if the enhanced clustered computing system 200 is fragmented into two or more sub-clusters, the integrity protectors 202 and 204 ensures that at most one sub-cluster remains active while the other sub-clusters are shutdown. Moreover, the integrity protectors 202 and 204 allow the one remaining sub-cluster to safely take over services of other sub-cluster(s) in the clustered computing system after the other sub-cluster(s) has (have) been shutdown. As a result, the enhanced clustered computing system 200 can continue to provide services even when the clustered computing system has been fragmented into two or more disjointed sub-clusters due to an operational failure. For example, a failure can occur when one or more private interconnections between nodes fail and create two or more disjointed sub-clusters within the clustered computing system.

In accordance with one aspect of the invention, nodes of the enhanced clustered computing system are assigned one or more votes. In one embodiment, the votes are positive integers. Accordingly, when sub-clusters form, the integrity protectors 202 and 204 initiate a "vote count" for the sub-clusters that are formed. As a result, those nodes within sub-clusters that do not represent a majority of a total number of votes available (total votes available) in the clustered computing system will be shutdown. Since there can be at most one sub-cluster with a majority of the total votes available, at most one sub-cluster will remain active. Moreover, the integrity protectors 202 and 204 ensure that services that are to be taken over by the one sub-cluster are taken over at an appropriate time. In particular, the take over of the services can be delayed for an appropriate amount of time until the other sub-clusters have shutdown and no longer are providing such services.

Figure 2B:
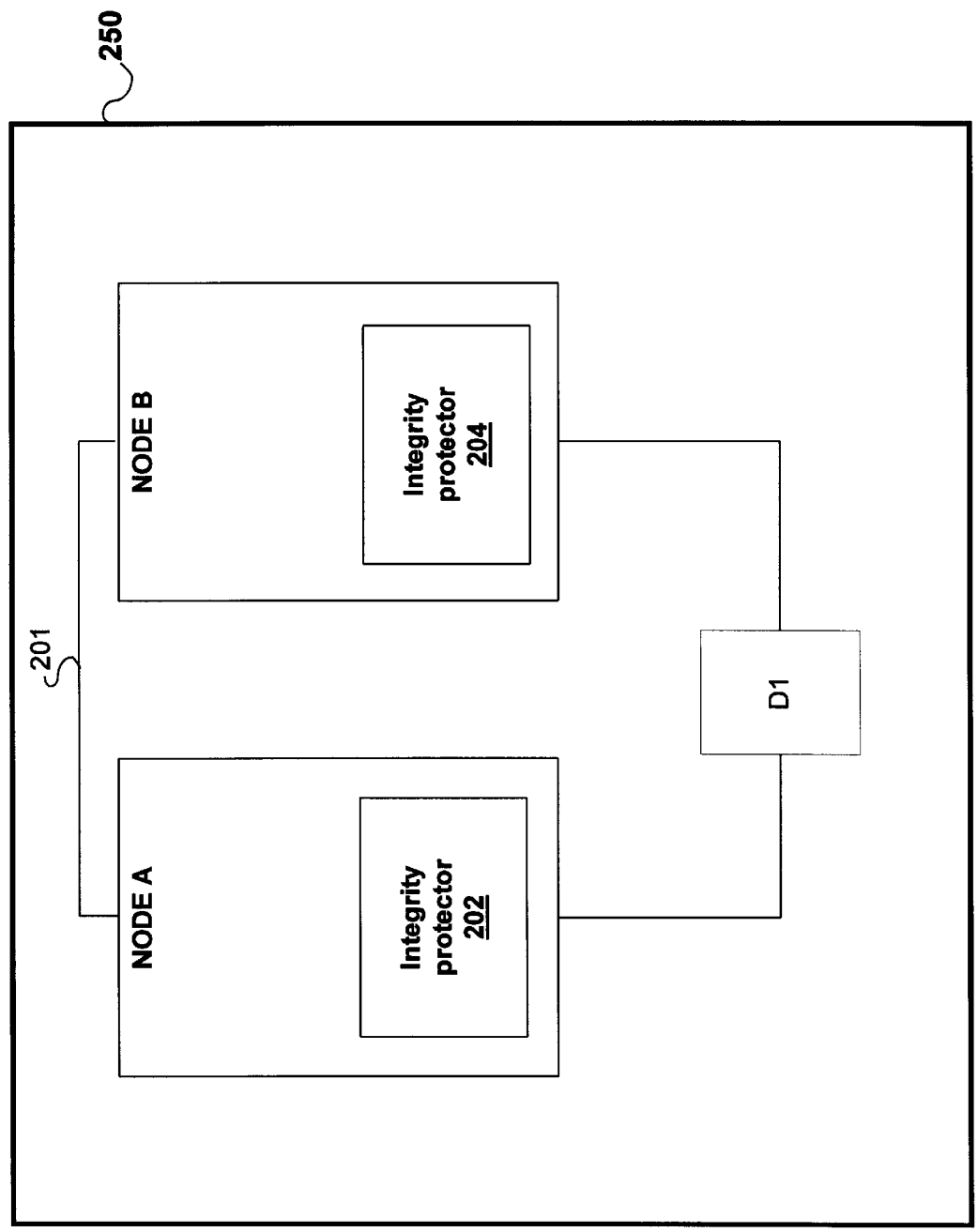
FIG. 2B illustrates an exemplary enhanced clustered computing system in accordance with another embodiment of the invention.

As noted earlier, in addition to nodes, clustered computing systems may also include devices such as storage devices (e.g., storage disks), printers, scanners, cameras, etc. In accordance with another aspect of the invention, such devices can be assigned "proxy" votes that can be controlled by one or more nodes in the clustered computing system. Devices that can be assigned proxy votes can be referred to as "proxy devices". FIG. 2B illustrates an exemplary enhanced clustered computing system 250 in accordance with another embodiment of the invention. The enhanced cluster computing system 250 is generally the same as the enhanced clustered computing system 200 of FIG. 2A but further includes, one or more other devices such as a storage device D1. The storage device D1 can be shared by nodes A and B such that it can be accessed by both nodes A and B. Accordingly, the storage device D1 can be assigned one or more proxy votes which can be considered in determination of the vote count noted above with respect to FIG. 2A.

Additional details about initiating a vote count (operational management processes) with or without proxy votes can be found in of U.S. patent application Ser. No. 09/480,785, entitled "METHOD AND APPARATUS FOR MANAGING OPERATIONS OF CLUSTERED COMPUTER SYSTEMS" which has been incorporated by reference above.

Figure 2C:
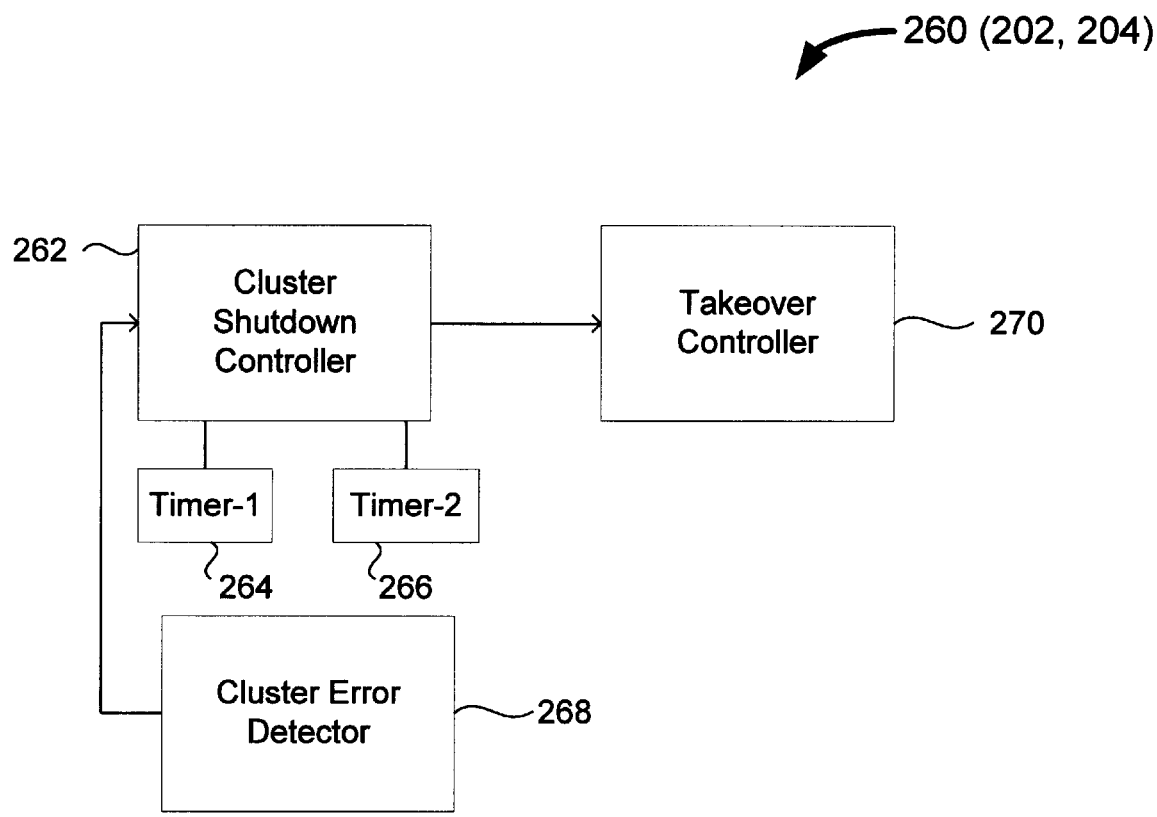
FIG. 2C illustrates an integrity protector in accordance with one embodiment of the invention.

FIG. 2C illustrates an integrity protector 260 in accordance with one embodiment of the invention. The integrity protector 260 of FIG. 2C represents an embodiment of the integrity protectors 202 and 204 shown in the enhanced clustered computing systems 200 and 250 of FIG. 2A and FIG. 2B, respectively. As shown in FIG. 2C, the integrity protector 260 includes a cluster shutdown controller 262, a timer-1 264, a timer-2 266, a cluster error detector 268, and a takeover controller 270. The cluster error detector 268 detects formation of two or more (disjointed) sub-clusters within an enhanced clustered computing system (e.g., enhanced clustered computing system 200 or 250 of FIGS. 2A and 2B, respectively). The detection of the two or more sub-clusters is described in greater detail below with respect to FIGS. 4A and 4B. For example, the formation of two or more (disjointed) sub-clusters can be the result of a failure of the private communication channels between computing nodes of the enhanced clustered computing system.

When formation of two or more disjointed sub-clusters is detected, the cluster error detector 268 activates the cluster shutdown controller 262. The cluster shutdown controller 262 then activates (starts) the timer-1 264. While the timer-1 264 is running, the shutdown controller 262 attempts to determine whether a sub-cluster that includes all the responsive nodes within the enhanced clustered computing system 200 or 250 is to remain active. For example, in one embodiment, the cluster shutdown controller 262 initiates a vote count and attempts to determine before timer-1 264 expires whether the sub-cluster possesses a majority of total votes available in the enhanced clustered computing system. However, it should be noted that the determination of whether a sub-cluster is to remain active can be done in other suitable ways.

Once the timer-1 264 expires, if the cluster shutdown controller 262 has not yet determined whether the sub-cluster should remain active, or if the cluster shutdown controller 262 has determined that the sub-cluster is not to remain active, shutdown of all the nodes in the sub-cluster is initiated by the shutdown controller 262. On the other hand, when the timer-1 262 expires, if the cluster shutdown controller 262 has been able to determine that the sub-cluster is the one sub-cluster that is to remain active within the enhanced clustered computing system, the cluster shutdown controller 262 activates the timer-2 266. The shutdown controller 262 then waits for the timer-2 266 to expire. Once the timer-2 266 expires, the cluster shutdown controller 262 activates a take over controller 270 to safely facilitate taking over services from other sub-clusters that have been shutdown. As will be appreciated by those skilled in the art, appropriate amount of time for timer-1 264 and appropriate amount of time for timer-2 266 can be determined to ensure that, the one sub-cluster remaining active takes over the services after the other sub-clusters have already been shutdown. Accordingly, the takeover controller 270 can allow the one sub-cluster that remains active to safely take over services that were previously provided by the other sub-clusters that have been shutdown.

Figure 3:
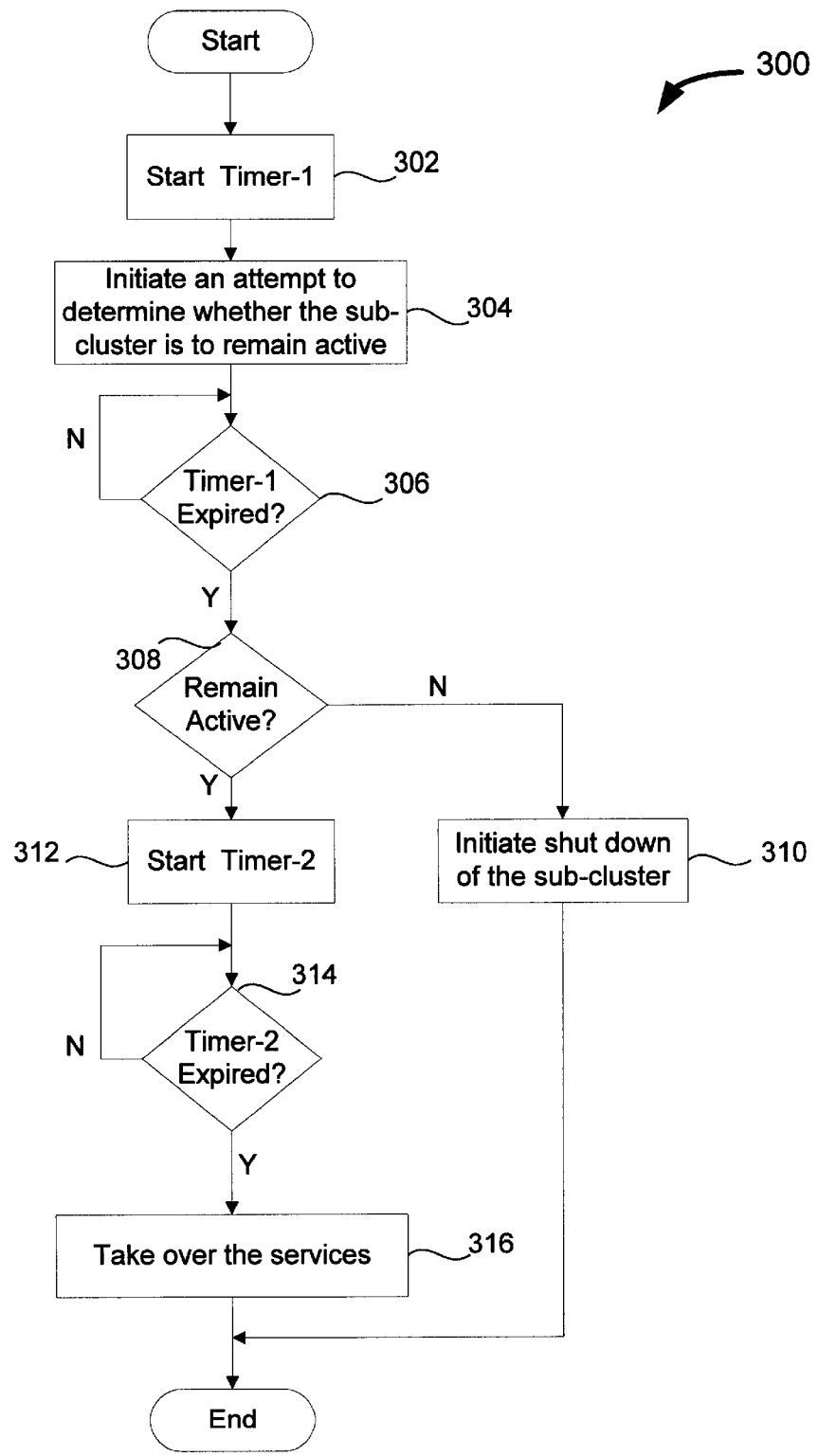
FIG. 3 illustrates a take over method for allowing one sub-cluster to take over services of one or more other sub-clusters in a clustered computing system in accordance with one embodiment of the invention.

FIG. 3 illustrates a take over method 300 for allowing one sub-cluster to take over services of one or more other sub-clusters in a clustered computing system in accordance with one embodiment of the invention. The take over method 300 can be performed by each node of the enhanced clustered computing system. For example, the take over method 300 can be performed by the integrity protectors 202 and 204 of enhanced clustered computing systems 200 and 250 of FIGS. 2A and 2B, respectively.

Initially, at operation 302 a first timer (timer-1) is initiated. Next, at operation 304, an attempt is initiated to determine whether the sub-cluster is the one sub-cluster within the enhanced clustered computing system that is to remain active. It should be noted that the sub-cluster represents the nodes that remain responsive to each other after the clustered computing system has fragmented into two or more sub-clusters. At operation 306, a determination is made as to whether the timer-1 has expired. When timer-1 has expired, the take over method 300 can proceed to operation 308 where a determination is made as to whether the operation 304 has been able to determine whether the sub-cluster is the one sub-cluster within the enhanced clustered computing system that is to remain active. If, at this time, the operation 304 has not been able to determine whether the sub-cluster is the one sub-cluster to remain active or if the operation 304 has determined that the sub-cluster is to be shutdown, the take over method 300 proceeds to operation 310. At the operation 310, shut down of the sub-cluster (i.e., all the nodes of the sub-cluster) is initiated.

On the other hand, if the determination in operation 308 determines that the operation 304 has determined that the sub-cluster is the one sub-cluster that is to remain active within the enhanced clustered computing system, the take over method 300 proceeds to operation 312 where a second timer (timer-2) is initiated. Next, at operation 314, a determination is made as to whether the timer-2 has expired. Once timer-2 has expired, the take over method 300 proceeds to operation 316 where the take over of the services (e.g., applications) of other sub-clusters that have been shutdown is initiated to enable the one remaining sub-cluster to take over these services.

Figure 4A:
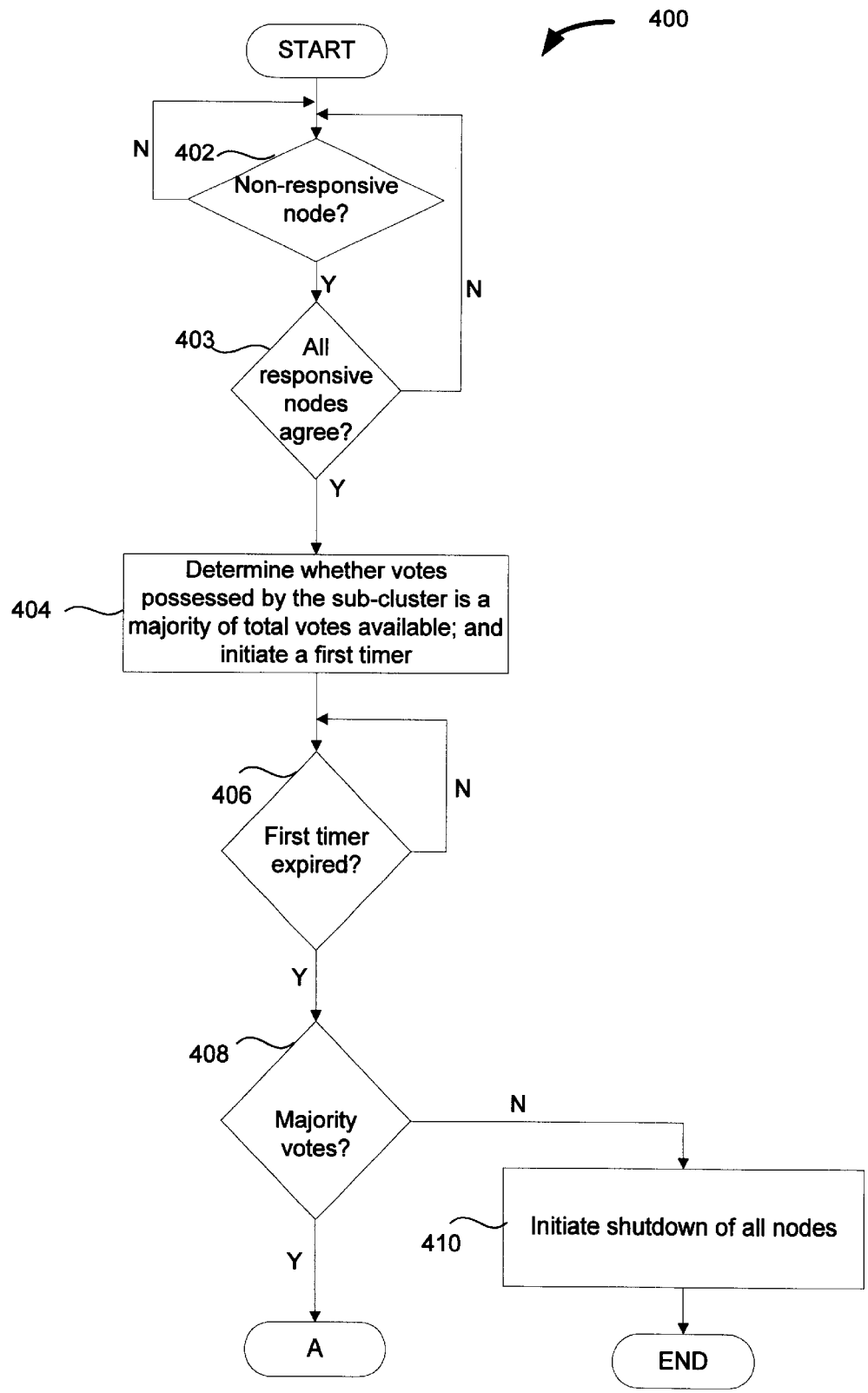
FIGS. 4A and 4B illustrate in greater detail a take over method for allowing one sub-cluster to take over services of one or more other sub-clusters in a clustered computing system in accordance with a particular embodiment of the invention.
Figure 4B:
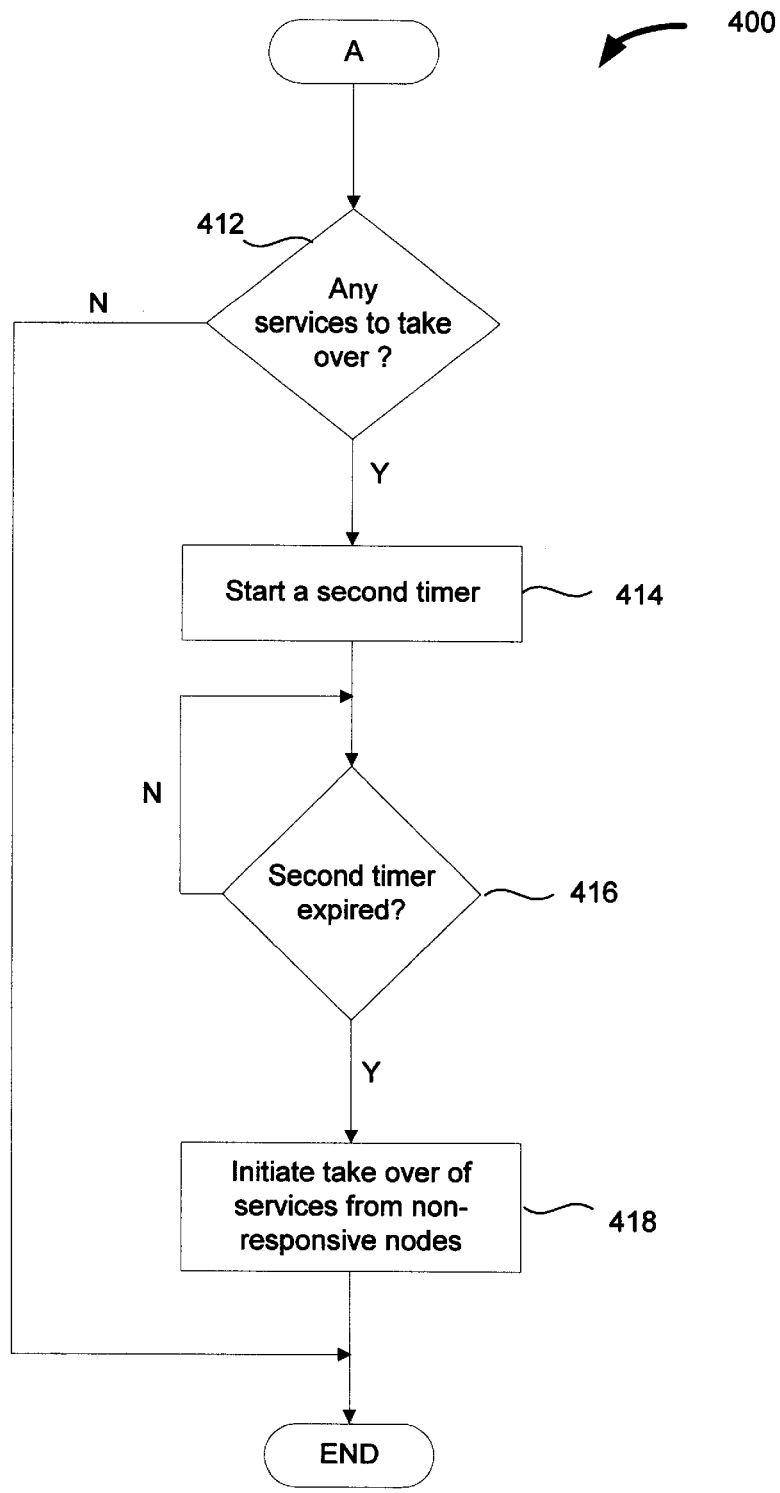

FIGS. 4A and 4B illustrate in greater detail a take over method 400 for allowing one sub-cluster to take over services of one or more other sub-clusters in a clustered computing system in accordance with a particular embodiment of the invention. The take over method 400 can be performed by each node of the of the enhanced clustered computing system. For example, the take over method 400 can be performed by the integrity protectors 202 and 204 of enhanced clustered computing systems 200 and 250 of FIGS. 2A and 2B, respectively.

Initially, at operation 402 a determination is made as to whether one of the nodes in the clustered computing system has become a non-responsive node with respect to another node (e.g., "a first node"). Each node in the clustered computing system periodically sends all the other nodes an activation signal that indicates that the node is operational. These activation signals are periodically sent and received by each node. If a first node does not receive an activation signal from a second node within a pre-determined period of time, the second node can be said to have become non-responsive to the first node. Detection of a non-responsive node implies either a problem with the non-responsive node or the presence of other problems such as failure of communication channels. In any case, when one or more non-responsive nodes are detected by the first node, it is possible that at least two disjointed sub-clusters have been formed. One disjointed sub-cluster can include the first node together with all the nodes that still remain responsive to the first node (as well as remaining responsive to each other). It should be noted that in a sub-cluster all the nodes of the sub-cluster remain responsive to each other. When a non-responsive node has been detected, the take over method 400 proceeds to operation 403 where it is determined whether all the nodes responsive to the first node agree that the second node has become a non-responsive node. If at least one responsive node still receives responses from the second node, a (disjointed) sub-cluster that includes the second node has not been created. However, if all responsive nodes agree that the second node has become a non-responsive node, a sub-cluster that includes at least the first node has been detected and the take over method 400 proceeds to operation 404.

At operation 404, a first timer is started and an attempt is made to determine whether the total number of votes possessed by the sub-cluster (the sub-cluster that includes the first node and all responsive nodes to the first node) is a majority of total votes available in the enhanced clustered computing system. The first timer indicates a predetermined amount of time that the attempt of operation 404 has to complete.

In one embodiment, the first predetermined amount of time is determined based on an upper approximation of time typically required to determine whether the votes possessed by a sub-cluster is a majority of total votes available in an enhanced clustered computing system. As will be appreciated by those skilled in the art, this first predetermined amount of time can be determined based on a variety of implementation specific factors. For example, in one particular embodiment, a first predetermined amount of about 2 minutes can be used. More generally, in accordance with other embodiments, the first predetermined amount of time can vary between 1–10 minutes. However, in general, the first predetermined amount of time will vary with the implementation of the clustered computing system.

Next, at operation 406, a determination is made as to when the first timer expires. When the first timer expires, the take over method 400 proceeds to operation 408 where a determination is made as to whether the attempt in operation 404 was able to determine that the votes possessed by the sub-cluster is a majority of the total votes available in the enhanced clustered computing system. If it is determined at operation 408 that the attempt has not been able to determine that the votes possessed by the sub-cluster is a majority, or if it is determined in operation 408 that the attempt has determined that the votes possessed by the sub-cluster is not a majority, then the take over method 400 proceeds to the operation 410. At the operation 410, shut down of all nodes within the sub-cluster is initiated and thereafter the take over method 400 ends.

On the other hand, if it is determined at operation 408 that the attempt in operation 404 has determined that the votes possessed by the sub-cluster is a majority of total votes available in the enhanced clustered computing system, the take over method 400 proceeds to an operation 412. At operation 412, a determination is made as to whether there are any services that need to be taken over. If there is not at least one service that needs to be taken over, the take over method 400 ends. However, if there are one or more services that need to be taken over, the take over method 400 proceeds to operation 414 where a second timer is started. The second timer is used to measure a second predetermined amount of time.

In one embodiment, the second predetermined amount of time is determined based on an upper bound estimation for the time typically required to detect a failure and the formation of two or more sub-clusters within the enhanced clustered computing system (e.g., the time typically required for operations 402 and 403 to complete after an error condition has occurred). As will be appreciated by those skilled in the art, the second predetermined amount of time can be determined based on a variety of implementation specific factors. For example, in a particular embodiment, a second predetermined amount of time of about 10 seconds can be used. However, more generally, in accordance with other embodiments, the second predetermined amount of time can vary between 1 to 60 seconds. However, in general, the first predetermined amount of time will vary with the implementation of the clustered computing system.

After the second timer has been started, a determination is made as to when the second timer expires at operation 416. When the second timer expires, the take over method 400 proceeds to operation 418 where take over of services by the one sub-cluster that remains active is initiated. As will be appreciated by those skilled in the art, take over of services can be safely initiated at operation 418 since all other sub-clusters are known to have been shut down when the second timer expires.

The invention can use a combination of hardware and software components. The software can be embodied as computer readable code on a computer readable medium. The computer readable medium is any data storage device that can store data which can thereafter be read by a computer system. Examples of the computer readable medium include read-only memory, random-access memory, CD-ROMs, magnetic tape, and optical data storage devices. The computer readable medium can also be distributed over a network coupled to computer systems so that the computer readable code is stored and executed in a distributed fashion.

The advantages of the invention are numerous. Different embodiments or implementations may have one or more of the following advantages. One advantage is that the invention provides for controlled take over of services in a clustered computing system. Another advantage is that controlled take over can be achieved without requiring human intervention. Still another advantage is that the techniques of the invention prevent data corruption or data loss from occurring during takeover of services from other nodes that are being shutdown. Yet another advantage is that cost effective and not overly complicated implementations are possible.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for taking over services by one or more remaining sub-clusters of a clustered computing system from one or more other sub-clusters of the clustered computing system after the one or more other sub-clusters have been shutdown, said method comprising:

(a) attempting to determine whether a sub-cluster of the clustered computing system is to remain active such that the processes of the sub-cluster may temporarily continue;

(b) initiating shutdown of the sub-cluster when said attempting (a) does not determine within a first predetermined amount of time that the sub-cluster is to remain active;

(c) to allow the processors of the sub-cluster to temporarily continue, delaying for a second predetermined amount of time after the first predetermined amount of time expires when said attempting (a) determines within the first predetermined amount of time that the sub-cluster is to remain active such that data corruption is avoided; and (d) taking over services of one or more other sub-clusters of the clustered computing system by one or more remaining sub-clusters after said delaying (c) for the second predetermined amount of time.

2. A method as recited in claim 1, wherein said method is performed by each of the sub-clusters of the clustered computing system.

3. A method as recited in claim 1, said method further comprising:

initiating shutdown of the sub-cluster when said attempting (a) determines within the first predetermined amount of time that the sub-cluster is not to remain active.

4. A method as recited in claim 1, wherein the first predetermined amount of time represents an upper estimate of time required to determine whether a sub-cluster is to remain active.

5. A method as recited in claim 1, wherein the second predetermined amount of time represents an upper estimate for a delay typically encountered in initiating said attempting (a) after an error condition has actually occurred.

6. A method for taking over services by one or more remaining sub-clusters of a clustered computing system from one or more other sub-clusters of the clustered computing system after the one or more other sub-clusters have been shutdown, said method comprising:

(a) determining whether one or more computing nodes in a cluster have become one or more non-responsive nodes;

(b) starting a first timer when said determining (a) determines that one or more of the computing nodes in the cluster have become one or more non-responsive nodes, the first timer having a first duration;

(c) attempting to determine whether a sub-cluster vote is at least a majority of a total votes available, the sub-cluster vote representing votes for a sub-cluster of one or more computing nodes, the sub-cluster representing a portion of the cluster that remains responsive;

(d) initiating shutdown of the one or more non-responsive computing nodes of the sub-cluster when said attempting (c) does not determine within the first duration of the first timer that the sub-cluster vote is at least a majority of the total votes available;

(e) to allow the processors of the sub-cluster to temporarily continue, starting a second timer after the first timer expires when the said attempting (c) has determined within the first duration of the first timer that the sub-cluster vote is at least a majority of the total votes available, the second timer having a second duration such that data corruption is avoided; and (f) taking over services from the one or more non-responsive nodes by at least one of the remaining computing nodes of the sub-cluster after the second timer expires.

7. A method as recited in claim 6, wherein said method is performed by each of the sub-clusters of the clustered computing system.

8. A method as recited in claim 6, wherein the (a) determining further comprises:

(a1) detecting that a computing node in the cluster that has become non-responsive with respect to a first node;

(a2) determining whether all responsive nodes to the first node agree that the computing node detected in detecting (a1) has become non-responsive.

9. A method as recited in claim 6, wherein the method further comprises:

determining whether there is at least one service of the one or more non-responsive nodes that needs to be taken over.

10. A computer readable medium including computer program code for taking over services by one or more remaining sub-clusters of a clustered computing system from one or more other sub-clusters of the clustered computing system after the one or more other sub-clusters have been shutdown, said computer readable medium comprising:

computer program code for attempting to determine whether a sub-cluster of the clustered computing system is to remain active such that the processes of the sub-cluster may temporarily continue;

computer program code for initiating shutdown of the sub-cluster when said computer program code for attempting does not determine within a first predetermined amount of time that the sub-cluster is to remain active;

computer program code for delaying for a second predetermined amount of time after the first predetermined amount of time expires when said computer program code for attempting determines within the first predetermined amount of time that the sub-cluster is to remain active such that the processes of the sub-cluster may temporarily continue; and computer program code to allow the processors of the sub-cluster to temporarily continue for taking over services of one or more other sub-clusters of the clustered computing system by one or more remaining sub-clusters after said computer program code for delaying has delayed for the second predetermined amount of time such that data corruption is avoided.

11. A computer readable medium as recited in claim 10, wherein the computer readable medium is provided for each of the sub-clusters of the clustered computing system.

12. A method as recited in claim 10, said method further comprising:

computer program code for initiating shutdown of the sub-cluster when said computer program code for attempting determines within the first predetermined amount of time that the sub-cluster is not to remain active.

13. A computer readable medium for taking over services by one or more remaining sub-clusters of a clustered computing system from one or more other sub-clusters of the clustered computing system after the one or more other sub-clusters have been shutdown, said computer readable medium comprising:

computer program code for determining whether one or more computing nodes in a cluster have become one or more non-responsive nodes;

computer program code for starting a first timer when said computer program code for determining determines that one or more of the computing nodes in the cluster have become one or more non-responsive nodes, the first timer having a first duration;

computer program code for attempting to determine whether a sub-cluster vote is at least a majority of a total votes available, the sub-cluster vote representing votes for a sub-cluster of one or more computing nodes, the sub-cluster representing a portion of the cluster that remains responsive;

computer program code for initiating shutdown of the one or more non-responsive computing nodes of the sub-cluster when said computer program code for attempting does not determine within the first duration of the first timer that the sub-cluster vote is at least a majority of the total votes available;

computer program code for starting a second timer to allow the processors of the sub-cluster to temporarily continue after the first timer expires when the said computer program code for attempting has determined within the first duration of the first timer that the sub-cluster vote is at least a majority of the total votes available, the second timer having a second duration such that data corruption is avoided; and computer program code for taking over services from the one or more non-responsive nodes by at least one of the remaining computing nodes of the sub-cluster after the second timer expires.

14. A computer readable medium as recited in claim 13, wherein the computer readable medium is provided for each of the sub-clusters of the clustered computing system.

15. A clustered computing system, comprising:

a cluster of computing nodes having at least two computing nodes; and an integrity protector, comprising:
- a cluster error detector operable to detect a formation of disjoint sub-clusters;
- a cluster shutdown controller operable to:
  - attempt to determine whether a sub-cluster of the clustered computing system is to remain active such that the processes of the sub-cluster may temporarily continue;
  - initiate shutdown of the sub-cluster when the attempt does not determine within a first predetermined amount of time that the sub-cluster is to remain active; and
  - to allow the processors of the sub-cluster to temporarily continue, delay for a second predetermined amount of time after the first predetermined amount of time expires when said attempt determines within the first predetermined amount of time that the sub-cluster is to remain active such that data corruption is avoided; and
- a takeover controller operable to:
  - take over services of one or more other sub-clusters of the clustered computing system by one or more remaining sub-clusters after the delay for the second predetermined amount of time.

16. The clustered computing system of claim 15, wherein the cluster shutdown controller is operable to:
   initiate shutdown of the sub-cluster when the attempt determines within the first predetermined amount of time that the sub-cluster is not to remain active.

17. The clustered computing system of claim 15, wherein the first predetermined amount of time represents an upper estimate of time required to determine whether a sub-cluster is to remain active.

18. The clustered computing system of claim 15, wherein the second predetermined amount of time represents an upper estimate for a delay typically encountered in initiating the attempt after an error condition has actually occurred.

* * * * *